United States Patent [19]

Jacob et al.

[11] Patent Number: 4,925,571

[45] Date of Patent: May 15, 1990

[54] METHOD FOR THE SIMULTANEOUS TRANSPORT AND PASTEURIZATION OF SEWAGE SLUDGE

[75] Inventors: A. Kirk Jacob, Lansdowne, Pa.; M. Joseph Willis, Oxford, Md.; A. Pierce Hardman, Trenton, N.J.

[73] Assignee: Organic Technology, Inc., Lansdowne, Pa.

[21] Appl. No.: 351,155

[22] Filed: May 12, 1989

[51] Int. Cl.⁵ ............................................. C02F 11/18
[52] U.S. Cl. ................................. 210/742; 210/764; 210/766; 210/774; 210/241; 71/903
[58] Field of Search ............... 210/609, 612, 613, 737, 210/742, 747, 751, 764, 765, 766, 774, 805, 806, 170, 241, 761, 242.1; 71/12–14, 903

[56] References Cited

U.S. PATENT DOCUMENTS

| | | | |
|---|---|---|---|
| 1,938,647 | 10/1933 | Earp-Thomas | 210/609 X |
| 2,847,379 | 8/1958 | Spiegel et al. | 210/613 X |
| 2,998,139 | 8/1961 | Novak | 210/612 X |
| 3,337,448 | 8/1967 | Rich | 210/612 |
| 3,395,799 | 8/1968 | Kurtz | 210/600 |
| 3,535,234 | 10/1970 | Gilwood | 210/612 |
| 3,613,623 | 10/1971 | Suzuki | 114/73 |
| 3,807,564 | 4/1974 | Hess et al. | 210/177 |
| 3,821,107 | 6/1974 | Peoples | 210/612 |
| 3,959,125 | 5/1976 | Teletzke | 210/603 |
| 3,959,126 | 5/1976 | Millward | 210/609 |
| 3,992,299 | 11/1976 | Wray | 210/195.3 |
| 4,001,108 | 1/1977 | Hellqvist | 210/612 |
| 4,008,155 | 2/1977 | Castell | 210/242.1 |
| 4,046,689 | 9/1977 | Argyll | 210/241 X |
| 4,066,545 | 1/1978 | Walters et al. | 210/739 |
| 4,082,672 | 4/1978 | Petroski | 210/241 X |
| 4,100,872 | 7/1978 | Matsuno et al. | 210/242.1 |
| 4,274,838 | 6/1981 | Dale et al. | 210/612 X |
| 4,290,890 | 9/1981 | Bauer | 210/609 X |
| 4,582,607 | 4/1986 | Kiese et al. | 210/612 |
| 4,604,206 | 8/1986 | Sullivan | 210/603 |
| 4,781,842 | 11/1988 | Nicholson | 210/764 X |

OTHER PUBLICATIONS

"Sand Dunes: Understanding Their Control", by George D. Ward and Associates, prepared for the U.S. Department of the Navy under Contract No. N62474-73-C-5136, dated 1971–1974.
"Sludge Pasteurization Systems", of Zimpro Incorporated, dated May, 1978.
U.S. Environmental Protection Agency, Grant No. C-06-1042-011.
Zimpro Technical Bulletin, Feb. 1970, Rev. Feb. 1975, "Characteristics of Thermally Treated Sewage Sludge".
LA/OMA Project, "Sludge Exportation Study", Aug. 1978.
Zimpro Inc. Technical Bulletin 2250-T, "Land Application of Thermally Treated Sewage Sludge".

Primary Examiner—Tom Wyse
Attorney, Agent, or Firm—Panitch Schwarze Jacobs & Nadel

[57] ABSTRACT

A process for treating sewage sludge having a predetermined water content to produce a soil conditioner, comprising (a) transporting the sludge aboard a vehicle; and (b) heating the sludge during the transporting step (a) to a temperature and for a time sufficient to pasteurize the sludge without substantially reducing the water content of the sludge. The treatment is conducted aboard any suitable vehicle, such as a ship, railroad car or truck. The heat required to pasteurize the sludge may be obtained from the vehicle's engine waste heat and/or an auxiliary heat source. The sludge is pasteurized during the vehicle's transit from one destination to another and thereby eliminates the requirement of performing a separate pasteurization process before the sludge has been loaded on the vehicle or after it has been unloaded from the vehicle. The present invention protects the public health and saves both time and money as compared with conventional processes of the prior art.

20 Claims, 2 Drawing Sheets

METHOD FOR THE SIMULTANEOUS TRANSPORT AND PASTEURIZATION OF SEWAGE SLUDGE

FIELD OF THE INVENTION

This invention relates to the treatment of sewage sludge while in transport to provide a useful material, such as an agricultural or other land treatment product. In a preferred embodiment, the process employs the waste heat of the propulsion system of the vehicle used for transport to pasteurize the sludge while in transit.

BACKGROUND OF THE INVENTION

"Sludge" is not raw human waste, but a by-product of wastewater or sewage treatment. Under normal treatment, raw human waste, carried in solution and suspension, is first subjected to primary treatment by settling and screening to dispose of sand, grit and some settleable solids. The settled solids are undigested or "raw" sludge. The layer containing the raw sludge is normally pumped to an anaerobic digester where the raw sludge is converted to an organically stable form.

The partially clarified sewage or supernatant, called "settled sewage," is then subjected to secondary treatment where it is used as nutrients by microorganisms that are provided with an excess of oxygen utilizing any one of many well-known methods of aeration. Typically, the secondary treatment comprises aeration followed by sedimentation ("settling") and digestion of the layer including the settled solids, aerobically and/or anaerobically. The resulting biological solids and treatment additives are settled out and the clarified effluent is removed for further processing. The material that settles out is digested and organically stable sludge. Although the sludge is typically separated by settling or sedimentation, it is primarily composed of a relatively small amount of solid particles, on the order of about one to about seven percent by weight, suspended in a liquid, primarily water. This product of the above-described process, or of an equivalent process, is what is treated by the process of the present invention.

As the sewage treatment process is conducted, the sludge accumulates in the waste treatment facility. This build-up of sludge must be periodically removed from the treatment plant to allow proper operation to continue. This accumulated sludge presents major disposal difficulties in the field of wastewater treatment.

Historically, sludge has been used as landfill or has been dumped in the ocean. Such means of disposal are no longer permitted due to health and environmental concerns. Major efforts are currently underway in the area of sludge management to provide appropriate means for disposing of sludge without harming the population or the environment. A wide variety of techniques have been and are currently being developed for treating raw sludge to allow for disposal, for example, by dewatering and subsequent incineration. In addition, pathogen reduction methods, such as the aerobic and anaerobic digestion techniques described above, have been incorporated into normal wastewater treatment processes in order to prepare the raw sludge for disposal, for example, by incineration. However, incineration introduces problems of air pollution from the burning of the sludge. These difficulties associated with the disposal of sewage sludge have spurred research efforts into new wastewater treatment and disposal techniques.

Resource recovery is a relatively new perspective for addressing the sludge disposal problem. Land application of human waste and sludge for their nutrient value to crops was common prior to the development of commercial chemical fertilizers and remains a common practice throughout many parts of the world. It is known that sludge can be used as a low grade fertilizer (in view of its low nitrogen content) or soil conditioner. It is also known that sludge can be used in the reclamation of desert lands. Applying sludge to sand dunes, for example, has been shown to be effective in stopping the growth of the dunes. The use of sludge in the reclamation of deserts, and as an agricultural fertilizer, is described in the published report entitled "Sand Dunes: Understanding Their Control", by George D. Ward and Associates, prepared for the U.S. Department of the Navy under Contract No. N62474-73-C-5136, dated 1971–1974.

However, current concerns for public health require that sludge be further processed if it is to be used as a fertilizer, as a soil conditioner, in land reclamation projects or the like. The sludge which is the current product of sewage treatment plants cannot be used for agricultural purposes without further treatment. Although sewage sludge is not as severe a threat to health or the environment as raw sewage, it still contains substantial quantities of bacteria, viruses and other organisms. Pasteurization, when applied to the pretreated sludge, is one of the methods considered to be acceptable to kill all harmful organisms. The publication entitled "Sludge Pasteurization Systems", of Zimpro Incorporated, dated May, 1978, discussed the need for pasteurization of sewage sludge. This publication discloses a reactor which sufficiently heats the sludge to cause pasteurization at up to 92.8° C. (200° F.) followed by digestion. The current U.S. federal standard for pasteurization of sewage sludge is to heat the sludge to 70° C. (158° F.) for at least thirty minutes. By definition, pasteurization will kill all pathogenic organisms remaining in the sludge.

Pasteurized sludge is suitable for disposal in land fills, for land reclamation, or for other agricultural purposes, and is the product produced by the present invention.

The present invention comprises a process for treating sewage sludge while in transport in large quantities in essentially conventional tanker vehicles, such as in ships, railroad cars, trucks, and the like, such that the sludge is fully pasteurized and capable of being safely used in agriculture, land reclamation or the like. Preferably, in accordance with the present invention, waste heat from the vehicle's engine used to propel the vehicle is used as a heat source to pasteurize the sludge.

The transport of sludge in tanker vessels was considered in a report sponsored by the U.S. Environmental Protection Agency, under Grant No. C-06-1042-011. The report concludes that the exportation of sludge as waste in tankers for the distance and under the circumstances of the report is not economically practical. However, this report does not discuss or even recognize the possibility or desirability of pasteurizing sludge while it is being transported in the tanker vessels.

Various patents disclose devices and methods for treating raw sewage in seagoing vessels. Examples are U.S. Pat. Nos. 3,337,448 3,395,799, 3,535,234, 3,807,564, 3,821,107 and 3,992,299. However, most of these references deal only with processing of small quantities of raw sewage generated by the crews aboard the ships. They do not concern the transportation and later use of treated sewage sludge. U.S. Pat. No. 3,395,799 discloses a device which heats sewage on a ship using the waste heat from the ship's engines. However, the patent also proposes dumping the heated sewage into the ocean and does not address transporting the sludge to another location for further use, such as land or agricultural applications.

The present invention is a novel method which allows sludge to be pasteurized, and therefore, conveniently and economically converted into a useful product while being transported. Particularly in its preferred form, the method is more efficient and economical, since some or all of the required process heat is obtained from the waste heat of the transportation vehicle's propulsion system. Large quantities of sewage sludge can be pasteurized effectively and completely while transporting the sludge long distances. In accordance with the present invention, not only is sewage sludge used for beneficial purposes, such as in land reclamation or agriculture, but also sludge is economically and practically disposed of without the health dangers previously associated with the disposal or use of sewage sludge.

SUMMARY OF THE INVENTION

The present invention is a process for treating sewage sludge having a predetermined water content to produce a soil conditioner, comprising (a) transporting the sludge aboard a vehicle; and (b) heating the sludge during the transporting step (a) to a temperature and for a time sufficient to pasteurize the sludge without substantially reducing the water content of the sludge.

DEFINITIONS

To aid in understanding the present invention, the following terms have the indicated meaning throughout the written description and the claims.

"Pasteurize," "pasteurization" or "pasteurizing," as used herein, means the process by which the bacteria and other pathogenic organisms in sludge are destroyed by sufficient heating for a sufficient time without other major chemical or physical alteration of the sludge.

"Sewage sludge," or "sludge," as used herein, means the sludge resulting from sewage that has been subjected to primary and secondary treatment, as in a municipal sewage treatment plant to remove relatively large solid materials and wherein the sewage has been aerated and/or anaerobically digested.

"Soil conditioner," as used herein, means a product resulting from the pasteurization of sewage sludge which is a pumpable liquid containing solid particles in suspension and which is suitable for use in land reclamation, landfill, or other agricultural purposes without substantially adversely affecting the soil to which it is applied.

"Vehicle", as used herein, means any water vehicle or land vehicle suitable for transporting sludge from one location to another. The vehicle may be self-propelled, such as a ship (e.g., a tanker), a motorized truck or may be a passive container, such as a water barge or railway car, propelled by an independent driving force, such as a tugboat or locomotive.

BRIEF DESCRIPTION OF THE DRAWINGS

For the purpose of illustrating the invention, the drawings show forms which are presently preferred; it being understood, however, that this invention is not limited to the precise arrangements and instrumentalities shown.

DETAILED DESCRIPTION OF THE PREFERRED EMBODIMENTS

Figure 1:
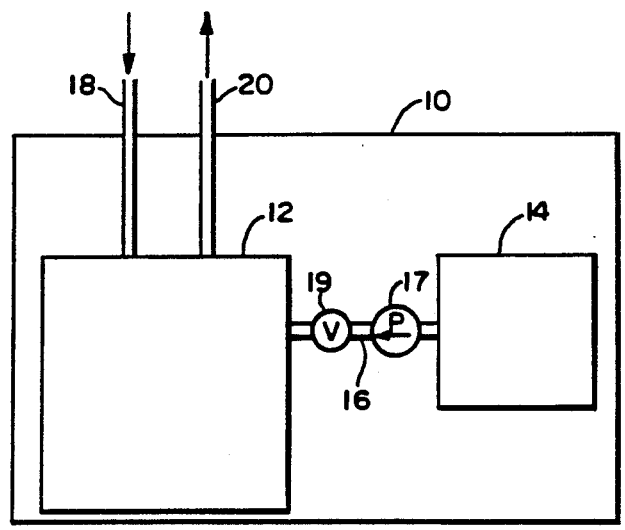
FIG. 1 is a schematic representation of a vehicle showing an apparatus to pasteurize sewage sludge in accordance with the present invention.

Referring to the drawings, wherein like numerals refer to like elements throughout the several views, FIG. 1 is a schematic representation of a vehicle including a sludge pasteurizing system for use in practicing the invention, in which a vehicle 10 includes a cargo area 12 for holding and pasteurizing sludge. The vehicle 10 is representational and can be any of the types defined above. Preferably, the vehicle is a tanker ship due to the volume of sludge that can be transported and efficiently and economically pasteurized therein over long distances. It is preferred that the cargo area comprise the majority of the volume of the vehicle, again for purposes of economical and efficient transport and pasteurization.

A heat source 14 generates heat which is conducted through a conduit 16 by any suitable pump or blower 17 through appropriate valving 19, such as remote controlled solenoid valves, to the cargo area 12.

Particularly in the case of a self-propelled vehicle, the heat source 14 may be the engine for driving or propelling the vehicle 10, since engines like internal combustion engines, diesel engines, steam engines or turbines and even nuclear powered engines generate a significant amount of waste heat. Alternately, whether or not the vehicle 10 is self-propelled, the heat source 14 may be or include a separate heat source, such as a fossil fuel burner, for example a gas burner or oil burner, or a combination of an engine and a separate or auxiliary heater. The heat produced by the heat source 14 typically is conveyed as a fluid, such as a heated gas, for example air, steam or even hot exhaust gases from which particulates have been removed by a filter or scrubber, or a liquid, such as water, or any other suitable heat exchange medium. Thus, the heat from the heat source 14 may heat the sludge directly or an intermediate heat transfer fluid which in turn heats the sludge, such that heat from the heat source 14 heats the sludge indirectly.

To the extent that the sludge evolves methane gas or other combustible gas, the gas can be used as a fuel for the heat source 14 in appropriate instances.

The cargo area 12 is provided with an inlet means 18 and an outlet means 20, by which the sludge may be loaded and unloaded from the cargo area. If desired, the inlet means 18 and the outlet means 20 can be combined to form a single opening or the like through which the sludge is both loaded and unloaded to and from the cargo area. The cargo area 12 typically may be jacketed with a hollow jacket containing the heat exchange fluid from the heat source 14. Likewise, a typical cargo area would include a series of tubes or plates arranged throughout the cargo area containing the heat exchange fluid for transferring heat from the fluid to the sludge in the cargo area. Suitable arrangements are well known to those skilled in the art, such as those used to transport asphalt or other products which require heating. The structural details of the cargo areas and the heat transfer system need not be described in detail, as their construction would be apparent to one skilled in the art. The same is true for appropriate control devices to control the valving and pumps controlling the flow of the heat exchange fluid and for loading and unloading the sludge.

The process of the current invention is performed with respect to FIG. 1 by loading sludge as primary cargo into the transport vehicle, such as a ship, railroad car, truck or airplane and using heat from the heat source 14 to pasteurize the sludge to produce a liquid soil conditioner suitable for agricultural land use while in transit. The sludge conversion may be made more economical if the waste heat from the vehicle's propulsion system is used as either the primary or supplementary source of process heat, although such use is not essential.

The application of the invention in a specific instance is dependent upon the characteristics of the vehicle 10 and the intended destination. The amount of sludge to be transported, the intended duration of the trip and the conditions required for pasteurization establish the basic heating requirements. The configuration of the vehicle's cargo storage and propulsion systems, the amount of waste heat generated during transport by the propulsion system and its practical availability set the parameters for selecting the exact process and equipment required.

In the presently preferred embodiment of the invention, the vessel 10 is a conventional tanker ship typically used to transport petroleum, bitumen or asphalt in heated cargo areas, since such tankers are known and would require little modification, if any, to transport and pasteurize sludge. The heat source 14 and heat distribution system for distributing heat throughout the sludge in the cargo area 12 must be capable of heating the sludge and maintaining it at the elevated temperature and time sufficient to pasteurize substantially all of the sludge being transported, thereby converting the cargo into a liquid soil conditioner suitable for agricultural use. The requirements of additional equipment, such as an auxiliary heating source, will be defined by the vessel's available waste heat and the duration of the voyage to assure that substantially the entire cargo of sludge will be subjected to the selected pasteurizing conditions of temperature and time upon completion of the voyage.

Figure 2:
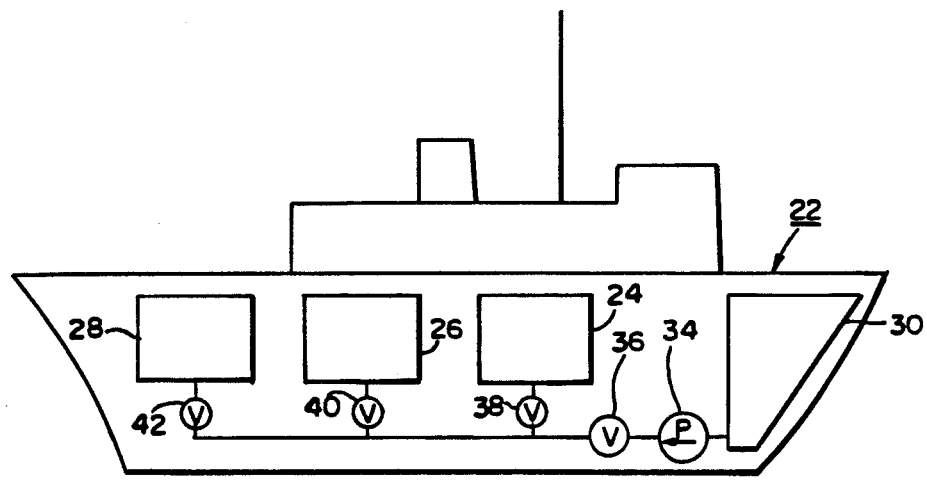
FIG. 2 is a schematic representation of a ship including a system for pasteurizing sludge in accordance with another embodiment of the invention.

A schematic representation of a tanker vessel including a system for pasteurizing sludge in accordance with another embodiment of the present invention is depicted in FIG. 2. A tanker vessel 22 includes a plurality of cargo areas represented generally as first, second and third cargo areas 24, 26 and 28, respectively. Preferably, these cargo areas comprise the majority of the volume of vessel 22. The vessel may have a greater or lesser number of cargo areas than shown. The vessel also includes a heat source 30 which can be the engine or engines of the vessel to use the heat or waste heat of the engine, or it can be a separate heater or a number of heaters. The heat source 30 generates heat exchange fluid, which is distributed to the cargo areas 24, 26 and 28 through a heat exchange fluid delivery conduit means 32 by a pump or blower 34. The conduit means 32 includes a plurality of valves, including a main valve 36 and valves 38, 40 and 42 for directing heat to each of the first, second and third cargo areas 24, 26 and 28, respectively. Alternatively, each of the cargo areas may have its own valve. When the valves are open, and the heat source is operating, the heat flows into each of the cargo areas. The conduit may be provided in a circuitous path (not shown) through each cargo area, to assure that the entire cargo is sufficiently heated to pasteurize the sludge.

If the engines are used to heat the sludge, the heat exchange medium may be steam, especially superheated steam, such as is used to drive turbines in tanker vessels currently in use. Any other arrangement can be used for transmitting the heat from the engines to a heat transfer medium and to the cargo. Tanker vessels having the necessary heat conducting conduits are already in existence and are typically used for keeping certain cargos (such as asphalt) warm and fluid while being transported. Such vessels use either the waste heat from the engines or separate heating devices.

The structure of the tanker vessel itself, including the means for generating the necessary heat, and for conducting the heat to the cargo areas is known, and does not form a part of this invention in its broadest scope.

After the sludge has been loaded, the tanker vessel sails away on its voyage, normally on a transoceanic route. During this voyage, the valves 36, 38, 40 and 42 are opened, directing the heat into the cargo areas 24, 26 and 28, such that the sludge becomes heated and eventually pasteurized. The entire cargo of sludge needs to be maintained at a temperature of at least 70° C. (158° F.) for at least 30 minutes, to be pasteurized. Other equivalent temperatures and times will be apparent to those skilled in the art. For example, to assure that substantially the entire volume of sludge is maintained at the required temperature for the required time, the cargo may be heated to a temperature somewhat higher than 70° C. (158° F.), but not so high that the sludge becomes dewatered. The soil conditioner resulting from the pasteurized sludge should have a moisture content about the same as the moisture content of the unpasteurized sludge. Thus, a temperature of about 93.3° C. (200° F.) or other temperature causing significant evaporation would be too high.

In general, the time required for pasteurization of the sludge depends in part on the volume of sludge being heated. The smaller the volume, the shorter the required heating and duration of the voyage. Of course, it is important that there be substantially no regions in the cargo of sludge that have not been sufficiently heated to be pasteurized.

Although it is important for pasteurization that there be a 30-minute period during which substantially the entire volume of sludge is at a temperature of at least 70° C. (158° F.), it is not important when that period occurs. It may be that the desired temperature and holding period are not reached until several days after the voyage begins. The desired temperature and holding period may be reached and satisfied early during the voyage, whereby the sludge is entirely pasteurized well before the voyage ends.

When the tanker reaches its destination, the cargo of soil conditioner (pasteurized sludge) can be removed, and is ready for immediate use.

Figure 3:
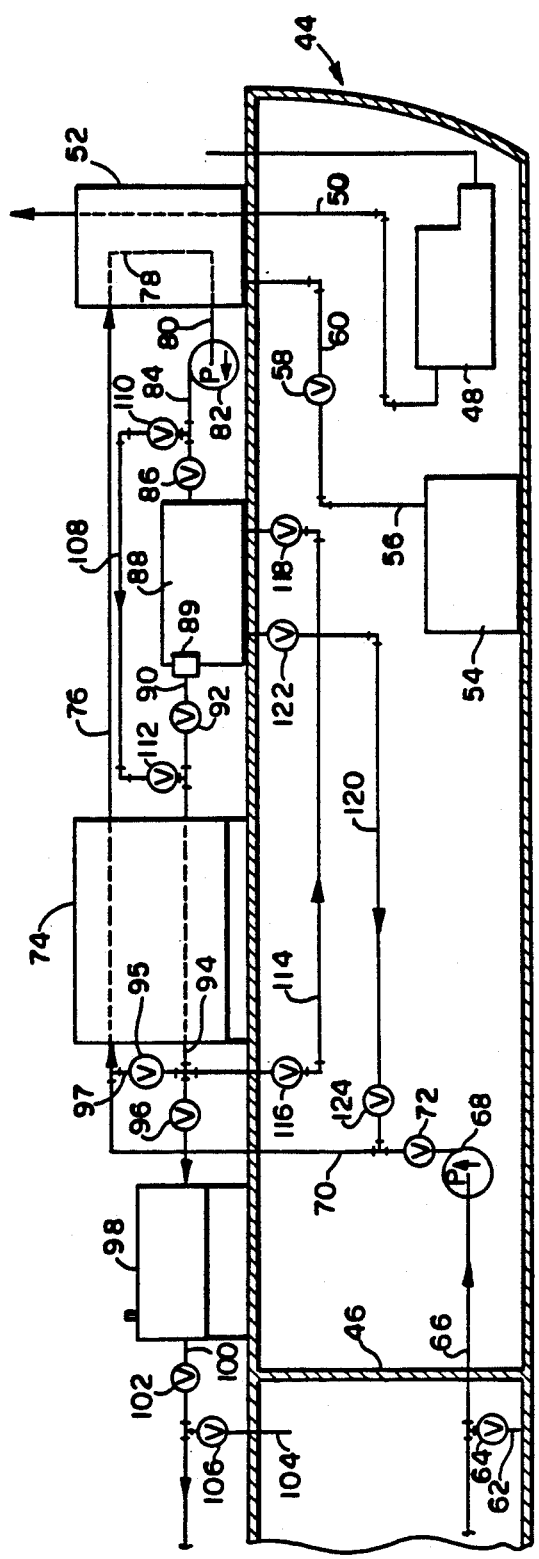
FIG. 3 is a schematic representation of a ship including a flow diagram of apparatus for pasteurizing sludge according to another alternate embodiment of the present invention.

FIG. 3 illustrates schematically a pasteurizing system according to the present invention preferably used in a tanker vessel 44, the aft portion of which is shown in the Figure. The vessel 44 includes one or more cargo areas, generally represented by the cargo area 46. In the embodiment of FIG. 3, the heat source may be, and preferably is, in the form of the tanker vessel's engine 48, typically a diesel engine, which has an exhaust conduit 50 through which the combustion products of the diesel engine are exhausted. The exhaust conduit 50 is in heat exchange communication with a heat exchanger 52 by which the waste heat from the exhaust is exchanged directly or indirectly to the sludge in a manner described hereinafter. If desired, an alternate or auxiliary heat source 54 may be used in lieu of or in addition to the ship's engine 48. Auxiliary heat source 54 may be of any suitable type, such as the fossil fuel burners described hereinbefore. Heat from the auxiliary heat source 54 is conveyed through a conduit 56, a valve 58 and in heat exchange communication with the heat exchanger 52.

Although any type of heat distribution system for distributing heat throughout the cargo areas of the vessel may be used, the following description of a presently preferred embodiment for heating the sludge contained in the vessel 44 will be described with particular reference to FIG. 3.

The sludge to be treated in the cargo area 46 is pumped through a conduit 62, a valve 64 and a conduit 66 by a pump 68. The pump 68 is the primary source for moving the sludge through the heating system. The sludge is further pumped through a conduit 70, a valve 72 and into a recuperator 74.

The recuperator 74 is a recuperative heat exchanger by which residual heat from the previously heated and pasteurized sludge is exchanged with and, thereby, recuperated into the sludge yet to be heated. Thus, the sludge is warmed to an intermediate temperature by the recuperator 74. The recuperator is preferably a counterflow heat recuperator, but may take any suitable form of a typical heat exchanger well known to those skilled in the art. Accordingly, the details of the construction of the recuperator 74 need not be described here.

From the recuperator 74, the sludge travels through a conduit 76 into a heat exchange coil or other heat exchange structure within the heat exchanger 52. It is preferred that the heat exchanger be of a counterflow design, but any other suitable structure known to those skilled in the art may be used with the present invention. There, the sludge is heated at least to the minimum temperature required for pasteurization, and preferably to a somewhat higher temperature. As described hereinbefore, the temperature should not be so high to cause evaporation and any substantial reduction in water or other liquid content.

From the heat exchanger 52, the heated sludge is conveyed through a conduit 80. If desired, an auxiliary pump 82 can be used in conjunction with the pump 68 to pump the sludge through the heating system. During the normal operation after the warmup of the system, sludge is pumped through a conduit 84 and a valve 86 into a pasteurization process tank 88. The pasteurization process tank 88 typically is in the form of an insulated tank or vessel in which a large quantity of the heated sludge may be retained. During the retention time, the temperature of the heated sludge is maintained at or above the required pasteurization temperature for the required time. For example, in accordance with current practices, the temperature within the tank 88 should be maintained at or above 70° C. (158° F.) for at least 30 minutes. In the tank 88, the sludge is converted to the pasteurized liquid soil conditioner suitable for agricultural use.

From the tank 88, the sludge travels through a conduit 90, a valve 92 and into the recuperator 74. As explained above, in the recuperator 74, the heated sludge yields some of its heat to preheat the unheated sludge.

From the recuperator 74, the sludge is conveyed through a conduit 94 and a valve 96 into a holding tank 98. Recycle valve 95, to be described hereinafter, is normally closed during the main operation of the system. The holding tank 98, for the temporary storage of the soil conditioner product, is used to keep the soil conditioner product separate from untreated sludge while the cargo area 46 is being emptied. From the holding tank 98, the soil conditioner is conveyed through a conduit 100, a valve 102, a conduit 104 and a valve 106 back into the cargo area 46 which had been previously emptied of all untreated sludge. It is preferred that each of a plurality of cargo areas represented by the cargo area 46 have a capacity less than the capacity of the heat delivery system, including the tank 88, the recuperator 74 and the holding tank 98. As noted above with respect to the other embodiments, the cargo areas should comprise the majority of the volume of the vessel to maximize the efficiency and economy of the process. Likewise, to further maximize efficiency and economy, the sludge should fill the cargo areas as much as possible. Nevertheless, if desired, the cargo areas need not be filled to capacity.

The embodiment of FIG. 3 also includes an optional, but presently preferred subsystem for initially warming the sludge at the beginning of the voyage and for initiating the heating and pasteurizing process. In general, the flow of the untreated sludge from the cargo area 46 throughout the system is as explained above after the system has reached its warmup temperature, with the following exceptions.

During the start-up period, the sludge or another liquid, preferably water, is used to fill the conduits and components of the system, except for the holding tank. The sludge or other liquid may be pumped from the cargo area 46 through the conduit 62, the valve 64 and the conduit 66. The sludge or other liquid then travels through the pump 68, the conduit 70, the valve 72 and the recuperator 74. Once the desired volume of sludge or other liquid is pumped from the cargo area 46, the valve 72 is closed. After traveling through the conduit 76 into the heat exchanger 52, the sludge or other start-up liquid is heated in the heat exchange section 78, and pumped by pump 82 through the conduits 80 and 84. During the start-up period, the reactor inlet valve 86 and the reactor outlet valve 92 are closed and the sludge or other start-up liquid is pumped through a bypass conduit 108 through first and second bypass valves 110 and 112, into the conduit 90 and then into the recuperator 74.

Further, during the start-up period, the valve 96 is closed and the sludge or other start-up liquid is conveyed through a conduit 114, through third and fourth bypass valves 116 and 118, and then into the tank 88. The heated sludge or other start-up liquid then travels through a conduit 120 and through fifth and sixth bypass valves 122 and 124 into the conduit 70. Since the valve 72 has been closed, the auxiliary pump 82 is the only pump used to pump the sludge or other liquid through the start-up subsystem. Until the sludge or other start-up liquid is heated to an appropriate temperature for pasteurization in the tank 88, as determined by any suitable temperature sensors, the subsystem continues to operate. Once the sludge or other start-up liquid reaches the desired pasteurization temperature, such that a suitable temperature is capable of being maintained in the tank 88, the recycle valve 95, all of the bypass valves 110, 112, 116, 118, 122 and 124 are closed, and the valves for the main system, namely, valves 72, 86, 92 and 96 are opened, and the sludge is heated using the general, main operating system as described above.

At the destination, the cargo of soil conditioner is off-loaded from the tanker 44. Except for the start-up period, preferably the process is continuous, if necessary, throughout the period of the voyage, resulting in complete processing of the entire cargo by the end of the voyage.

As noted, the sludge must be heated to at least 70° C. (158° F.) for at least 30 minutes before it is allowed to cool. In order to assure that substantially the entire volume of sludge is maintained at the required temperature for the required time, the pumping rate must be sufficient to pump the entire cargo of sludge into the tank 88 over the duration of the voyage. Moreover, the tank 88 must be sized in proportion to allow a sufficient residence time at the temperature required for pasteurization. The time required for heat treating the sludge depends upon the heat available and the volume of sludge to be heated. The greater the heat and smaller the volume, the shorter the required process time. Alternatively, less heat and a greater volume requires a longer process time. Provided that the required time is less than the duration of the voyage, the process can be successfully completed.

To assure that the sludge is heated to a sufficient temperature and is maintained at that temperature for a sufficient time in the pasteurization process tank 88 to pasteurize the sludge and convert the sludge to a soil conditioner according to the present invention, a pasteurization monitoring means 89 may be provided, preferably at or near the outlet of the tank 88. The pasteurization monitoring means 89 may comprise a temperature sensor and a timer and/or a flow monitor or other device for determining the residence time of the sludge in the tank 88. The type of devices used, which are well known to those skilled in the art, would depend on whether the process of the present invention is a continuous process, in which case, a flow monitor may be more desirable, or a batch process, in which case, a timer may be more desirable.

The monitoring means 89 may include or be connected to a separate alarm and/or control means (not shown) to shut down the entire system automatically or control the automatic recycling of inadequately pasteurized sludge to be reheated in the recuperator 74 and/or the heat exchanger 52. If desired, the alarm and/or control means can merely indicate an alarm by which manual adjustments may be made to the system.

As presently preferred in the embodiment of the invention schematically illustrated in FIG. 3, the monitoring means 89 includes a control means for automatically sensing that the sludge has either not been heated to a sufficient temperature or maintained for a sufficient time at a sufficient temperature to be pasteurized, and for automatically recycling the sludge to be reheated. The recycle system includes controls well known to those skilled in the art for automatically opening the recycle valve 95, closing valves 96 and 116, and energizing the pump 82, to recycle the inadequately pasteurized sludge through a recycle conduit 97, from where it travels through the conduit 70 into the recuperator 74 and then through the conduit 76 into the heat exchanger 52 where it is reheated. Ultimately, the reheated sludge reenters the pasteurization process tank 88. Prior to leaving the tank 88, if the sludge is then sufficiently pasteurized as determined by the monitoring means 89, the recycle valve 95 is closed, the pump 82 is deenergized and the valve 96 is opened. This allows a return to the main operating mode.

Depending upon the specifics as to heat available from the engine 48, the amount of sludge to be pasteurized and the anticipated duration of the voyage, various components may not be required. For example, if the engine 48 and/or the auxiliary heater 54 provide enough heat to process the entire cargo of sludge, the recuperator 74 may not be necessary. It is possible that neither the pasteurization process tank 88 nor the holding tank 98 would be necessary. Moreover, some tanker vessels are already equipped to transfer heat to the vessel's cargo area to maintain the cargo at some desired temperature. Implementing the invention on such a vessel might simply require linking the auxiliary heat source 54 and/or the heat exchanger 52 to the existing heat distribution system, augmenting the normal "maintenance heat" (designed to make up heat loss through the hull in transit), with sufficient additional heat from the heat exchanger to effect the heat treatment desired. Heat treatment might then take place in the cargo area 46, also eliminating the need for both the pasteurization process tank 88 and the holding tank 98.

Regardless of the specific type of heating system to be used in connection with the process of the present invention on any vehicle, suitable sensors and controls to control the opening and closing of valves, the starting and stopping of pumps, the operation of any auxiliary heat sources, and the like, would be necessary. Such sensors and process controls may be selected from any of those currently available commercially and well known to those skilled in the art.

In the present invention, it is preferred that the waste heat of the engine of the vehicle can be put to profitable use. Whether or not waste heat alone is used to heat the sludge, the method eliminates the requirement of performing a separate heat treatment process prior to shipping or after the sludge has been off-loaded from the vehicle. The present invention therefore saves both time and money, as compared with conventional processes of the prior art.

The following specific, non-limiting example of a possible pasteurization system which could be installed in or be part of a tanker vessel may be helpful to further understand the present invention. The numerical values relating to the capacities and heat transfer information are based on various assumptions and standard thermodynamic principles, rather than actual testing of a system constructed as illustrated generally in FIG. 3 or any other specific embodiment of the present invention.

A typical 59,000 dead weight tonage (DWT) oil tanker has a net cargo capacity of 55,000 tons, and is equipped with a 9,000 horsepower (HP) diesel engine. Assuming that the entire cargo is sludge, and that a voyage will take 15 days traveling at 15 knots, the sludge must be processed at the rate of 342,200 lbs/hr throughout the voyage. At this processing rate, pasteurization will require the availability of 30,115,000 British Thermal Units (Btu)/hr. At the indicated speed, the vessel will burn 51 tons of diesel fuel/day. Assuming an air:fuel ratio of 15 to 1, and a stack exhaust temperature of 426.7° C. (800° F.), the process using the system illustrated in FIG. 3 is believed to be able to achieve the conditions required for pasteurization of the sludge. The recuperator 74 should recover approximately 21,104,000 Btu/hr and the heat exchanger 52 should transfer approximately 9,011,000 BTU/hr, such that the recuperator 74 and the heat exchanger 52 in combination can heat the sludge to pasteurization temperature within the assumed 15-day duration of the voyage.

With typical overall heat transfer coefficients, the counterflow heat exchanger 52 will require an effective heat transfer area of about 2,500 square feet and the counterflow recuperator approximately 3,600 square feet. Assuming the sludge is stored at an ambient temperature of 21.1° C. (70° F.), it will be preheated to 55° C. (131° F.) by the recuperator 74, then to the required 70° C. (158° F.) by the heat exchanger 52. Upon exiting the pasteurization process tank 88, the soil conditioner effluent will lose heat to the recuperator 74, dropping in temperature to approximately 35.5° C. (96° F.) before being returned to the cargo area 46. (Use of the recuperator 74 in lieu of the auxiliary heater 54 eliminates the additional fuel required by the auxiliary heater 54 to augment the waste heat available from the engine 48.)

It should be emphasized that the purpose of the present invention is not to treat the waste produced by the ship's crew. Such waste is raw sewage, not sewage sludge. In addition, the present invention is concerned with the pasteurization of large, commercially valuable quantities of sludge, not the comparatively small quantity of waste produced by the crew. Moreover, the present invention is not limited to any particular transport vehicle. The method will operate with any vehicle equipped with the means to heat sludge while the sludge is being transported. Thus, many variations of the invention are possible. The present invention may be embodied in other specific forms without departing from the spirit or essential attributes thereof and, accordingly, reference should be made to the appended claims, rather than to the foregoing specification as indicating the scope of the invention.

We claim:

1. A process for treating sewage sludge having a predetermined water content to produce a soil conditioner, comprising
    (a) transporting the sludge aboard a vehicle; and
    (b) heating the sludge during the transporting step (a) to a temperature and for a time sufficient to pasteurize the sludge without substantially reducing the water content of the sludge.

2. The process of claim 1 wherein the heating is performed by conducting heat through the sludge from a heat source comprising an engine for driving the vehicle.

3. The process of claim 1 wherein the heating is performed by conducting heat through the sludge from a heat source other than an engine for driving the vehicle.

4. The process of claim 1 wherein the heating is performed by conducting heat through the sludge from a heat source selected from the group consisting of an engine for driving the vehicle, an auxiliary heat source and a combination thereof.

5. The process of claim 1 wherein the vehicle is selected from the group consisting of a water vehicle and a land vehicle.

6. The process of claim 1 wherein the pasteurization of the sludge is conducted by heating the sludge to a temperature of about 70° C. (158° F.) for about thirty minutes.

7. The process of claim 1 wherein the vehicle has cargo areas comprising the majority of the volume of the vehicle, a heat source, conduit means for directing heat from the heat source into the cargo areas, and means for causing the heat to flow from the heat source through the conduit means to the cargo areas; the process further comprising loading sewage sludge into the cargo areas; transporting the sludge in the cargo areas; and heating the sludge using heat from the heat source, wherein the transporting and heating are performed for a time sufficient to pasteurize the sludge in the cargo areas.

8. The process of claim 7 wherein the loading step is performed until substantially all of the volume of the cargo areas has been filled.

9. The process of claim 7 wherein the means for causing heat to flow comprises valve means for selectively directing the heat from the heat source through the conduit means to the cargo areas.

10. The process of claim 7 wherein the means for causing heat to flow comprises pumping means for selectively pumping heated fluid from the heat source through the conduit means to the cargo areas.

11. The process of claim 7 wherein the means for causing heat to flow comprises pumping means and valve means for selectively pumping and directing heated fluid from the heat source through the conduit means to the cargo areas.

12. The process of claim 7 wherein the vehicle is a ship having an engine for propelling the ship through water, the heat source being the engine.

13. The process of claim 7 wherein the vehicle is a ship having an engine for propelling the ship through water and wherein the heat source is a heat source separate from the engine.

14. The process of claim 7 wherein the vehicle is a ship having an engine for propelling the ship through water, the engine being a first heat source, a second heat source being a heat source separate from the engine, each of the first and second heat sources generating heated fluid to flow through the conduit means to the cargo areas, and wherein the means for causing heat to flow comprises valve means for selectively directing the heated fluid from at least one of the heat sources through the conduit means to the cargo areas.

15. The process according to claim 14 wherein the means for causing the heat to flow further comprises pumping means for selectively pumping the heated fluid from at least one of the heat sources through the conduit means and to the cargo areas.

16. The process of claim 1 wherein the vehicle has a cargo area and heating step (b) comprises
    (i) pumping the sludge from the cargo area into a recuperative heat exchanger where the sludge is warmed to an intermediate temperature;
    (ii) passing the warmed sludge through a primary heat exchanger which heats the sludge from heat derived from at least one heat source;
    (iii) passing the fully heated sludge into a tank wherein the fully heated sludge is maintained for a time sufficient to pasteurize the sludge and thereby convert the sludge to a substantially liquid soil conditioner suitable for agricultural use;
    the process further comprising
    (c) passing the processed soil conditioner exiting the tank through a recuperative heat exchanger, wherein the heated soil conditioner yields some of its heat to preheat untreated sludge; and
    (d) returning the soil conditioner to the cargo areas.

17. The process of claim 16 further comprising an intermediate step between steps (c) and (d) of passing the soil conditioner from the recuperative heat exchanger to a holding tank to maintain the soil conditioner product separate from untreated sludge while the sludge is being pumped from the cargo area, and from the holding tank to the cargo area, after all of the untreated sludge has been pumped from the cargo area.

18. The process of claim 16 further comprising an intermediate step between steps (b)(iii) and (c) of monitoring the temperature of the heated sludge and the time the heat sludge has been maintained at a suitable pasteurization temperature prior to or just after the soil conditioner is exiting the tank to determine that the heated sludge has been pasteurized.

19. The process of claim 18 wherein the monitoring step includes indicating when the heated sludge exits the tank without being pasteurized.

20. The process of claim 19 wherein the monitoring step further comprises recycling inadequately pasteurized heated sludge or soil conditioner exiting the tank to reheat the sludge in the recuperator and/or heat exchanger.

* * * * *